United States Patent
Sudou et al.

(10) Patent No.: US 9,327,727 B2
(45) Date of Patent: May 3, 2016

(54) VEHICLE DRIVING CONTROL APPARATUS

(71) Applicant: DENSO CORPORATION, Kariya, Aichi-pref. (JP)

(72) Inventors: Takuma Sudou, Obu (JP); Jin Kurumisawa, Obu (JP); Takaomi Kinugawa, Kariya (JP); Toyohito Nozawa, Aichi-ken (JP); Tatsuya Namikiri, Seoul (KR)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/618,309

(22) Filed: Feb. 10, 2015

(65) Prior Publication Data
US 2015/0224991 A1    Aug. 13, 2015

(30) Foreign Application Priority Data

Feb. 13, 2014 (JP) ................. 2014-025381

(51) Int. Cl.
*B60T 7/12* (2006.01)
*B60W 30/14* (2006.01)
*B60W 10/06* (2006.01)
*B60W 10/18* (2012.01)
*B60W 30/16* (2012.01)

(52) U.S. Cl.
CPC ............. *B60W 30/143* (2013.01); *B60W 10/06* (2013.01); *B60W 10/18* (2013.01); *B60W 30/16* (2013.01); *B60W 2550/302* (2013.01); *B60W 2720/106* (2013.01); *B60W 2750/308* (2013.01)

(58) Field of Classification Search
None
See application file for complete search history.

(56) References Cited

U.S. PATENT DOCUMENTS

| 6,418,370 | B1 | 7/2002 | Isogai et al. |
| 2006/0290202 | A1* | 12/2006 | Shibata et al. ................ 303/165 |
| 2012/0010792 | A1* | 1/2012 | Nedorezov et al. ............ 701/54 |

FOREIGN PATENT DOCUMENTS

| JP | 08-310269 | 11/1996 |
| JP | 2000-108718 A | 4/2000 |
| JP | 2000-108721 A | 4/2000 |
| JP | 2001-026226 A | 1/2001 |
| JP | 2002-166747 A | 6/2002 |

(Continued)

OTHER PUBLICATIONS

Office Action dated Nov. 5, 2015 in corresponding Korean Application No. 10-2015-0013997 with English translation.

(Continued)

*Primary Examiner* — Adam Alharbi
(74) *Attorney, Agent, or Firm* — Harness, Dickey & Pierce, P.L.C.

(57) ABSTRACT

A vehicle driving control apparatus is provided for controlling an own vehicle to track a target vehicle. The vehicle driving control apparatus includes: (1) means for acquiring an actual relative speed of the target vehicle to the own vehicle; (2) means for detecting occurrence of an event which causes the actual relative speed to discontinuously change; (3) means for setting a target acceleration of the own vehicle based on the product of a relative speed gain and a tracking relative speed when the own vehicle tracks the target vehicle, the tracking relative speed being normally set to the actual relative speed; and (4) means for correcting, upon detection of occurrence of the event by the detecting means, the tracking relative speed so as to gradually increase the absolute value of the tracking relative speed from a value that is less than the absolute value of the actual relative speed.

7 Claims, 4 Drawing Sheets

(56) References Cited

FOREIGN PATENT DOCUMENTS

| | | |
|---|---|---|
| JP | 2002-178787 | 6/2002 |
| JP | 2010-143323 | 7/2010 |

OTHER PUBLICATIONS

Office Action mailed Mar. 8, 2016 in corresponding Japanese application No. 2014-025381 with English translation.

* cited by examiner

VEHICLE DRIVING CONTROL APPARATUS

CROSS-REFERENCE TO RELATED APPLICATION

This application is based on and claims priority from Japanese Patent Application No. 2014-25381 filed on Feb. 13, 2014, the content of which is hereby incorporated by reference in its entirety into this application.

BACKGROUND

1. Technical Field

The present invention relates generally to vehicle driving control apparatuses. More particularly, the invention relates to a vehicle driving control apparatus that controls an own vehicle to track (or follow) a preceding vehicle running ahead of the own vehicle.

2. Description of Related Art

To reduce the operating burden of a driver driving a vehicle, there have been developed vehicle driving control apparatuses that select a preceding vehicle, which runs ahead of the own vehicle, as a target vehicle, and control the speed of the own vehicle so as to keep the inter-vehicle distance between the own vehicle and the target vehicle constant, thereby making the own vehicle automatically track (or follow) the target vehicle.

For example, there is disclosed a vehicle driving control apparatus (or inter-vehicle distance control apparatus) in Japanese Patent Application Publication No. JP2010143323A. The vehicle driving control apparatus is configured to perform a tracking control, i.e., a control of making an own vehicle track a target vehicle (or preceding vehicle). Moreover, the apparatus is further configured to: stop the tracking control upon start of an accelerating or decelerating operation by a driver of the own vehicle; reset (or change) a target inter-vehicle distance based on the actual inter-vehicle distance when the relative speed between the target vehicle and the own vehicle becomes 0 after completion of the accelerating or decelerating operation; and resume the tracking control with the reset target inter-vehicle distance. Consequently, when the tracking control is resumed, it is unnecessary to perform additional deceleration and acceleration of the own vehicle for maintaining the target inter-vehicle distance.

However, besides the completion of an accelerating or decelerating operation made by the driver during the tracking control, there may also occur the following events where the relative speed between the target vehicle and the own vehicle changes not gradually but discontinuously: (a) an intervening vehicle, which intervenes between the own vehicle and the target vehicle, becomes a new target vehicle to track; and (b) the driver initiates the tracking control by operating a switch. In addition, the relative speed is positive when the target vehicle runs at a higher speed than and thus gets further from the own vehicle and negative when the target vehicle runs at a lower speed than and thus gets closer to the own vehicle.

In a normal tracking control, when the relative speed between the target vehicle and the own vehicle discontinuously changes, the own vehicle will be suddenly accelerated or decelerated so as to make the own vehicle track the target vehicle. Consequently, a shock will be caused by the sudden acceleration or deceleration of the own vehicle, thereby lowering the driveability of the own vehicle. In addition, this shock will be shortly referred to as acceleration shock or deceleration shock hereinafter.

The aforementioned patent document fails to disclose how to reduce the acceleration shock or deceleration shock caused by the tracking control when the relative speed between the target vehicle and the own vehicle discontinuously changes.

SUMMARY

According to an exemplary embodiment, there is provided a vehicle driving control apparatus for controlling an own vehicle to track a target vehicle. The target vehicle is a preceding vehicle which runs ahead of the own vehicle and is selected by the vehicle driving control apparatus to be tracked by the own vehicle. The vehicle driving control apparatus includes: (1) means for acquiring an actual relative speed of the target vehicle to the own vehicle; (2) means for detecting occurrence of an event which causes the actual relative speed of the target vehicle to the own vehicle to discontinuously change; (3) means for setting a target acceleration of the own vehicle based on the product of a relative speed gain and a tracking relative speed when the own vehicle tracks the target vehicle, the tracking relative speed being normally set to the actual relative speed of the target vehicle to the own vehicle; and (4) means for correcting, upon detection of occurrence of the event by the detecting means, the tracking relative speed so as to gradually increase the absolute value of the tracking relative speed from a value that is less than the absolute value of the actual relative speed of the target vehicle to the own vehicle.

Consequently, by correcting the tracking relative speed in the above manner, it is possible to reduce the acceleration shock or deceleration shock caused by the tracking control when the actual relative speed of the target vehicle to the own vehicle discontinuously changes upon occurrence of the event. Moreover, by setting the target acceleration of the own vehicle based on the thus-corrected tracking relative speed, it is possible to smoothly accelerate or decelerate the own vehicle to track (or follow) the target vehicle.

In further implementations, the correcting means may correct the tracking relative speed so as to gradually increase the absolute value of the tracking relative speed from 0.

Moreover, the correcting means may correct the tracking relative speed so as to gradually increase the absolute value of the tracking relative speed to approach the absolute value of the actual relative speed of the target vehicle to the own vehicle.

The event may be one of the following: (1) a preceding vehicle is newly selected as the target vehicle; (2) an intervening vehicle, which intervenes between the target vehicle and the own vehicle, replaces the target vehicle to become a new target vehicle; (3) an operation of accelerating or decelerating the own vehicle, which is made by a driver of the own vehicle during the tracking control, is completed; and (4) the tracking control is initiated by the driver of the own vehicle.

The vehicle driving control apparatus may further include means for acquiring an inter-vehicle distance between the target vehicle and the own vehicle. Moreover, upon detection of occurrence of the event by the detecting means, the correcting means may set the tracking relative speed to 0 as long as a first or a second correction condition is satisfied and then gradually increase the absolute value of the tracking relative speed from 0. Here, the first correction condition is such that the actual relative speed of the target vehicle to the own vehicle is positive and the inter-vehicle distance between the target vehicle and the own vehicle is shorter than or equal to a first predetermined distance; the second correction condition is such that the actual relative speed of the target vehicle to the own vehicle is negative and the inter-vehicle distance between the target vehicle and the own vehicle is longer than or equal to a second predetermined distance.

It is preferable that both upper and lower limits are defined for the target acceleration of the own vehicle set by the setting means.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
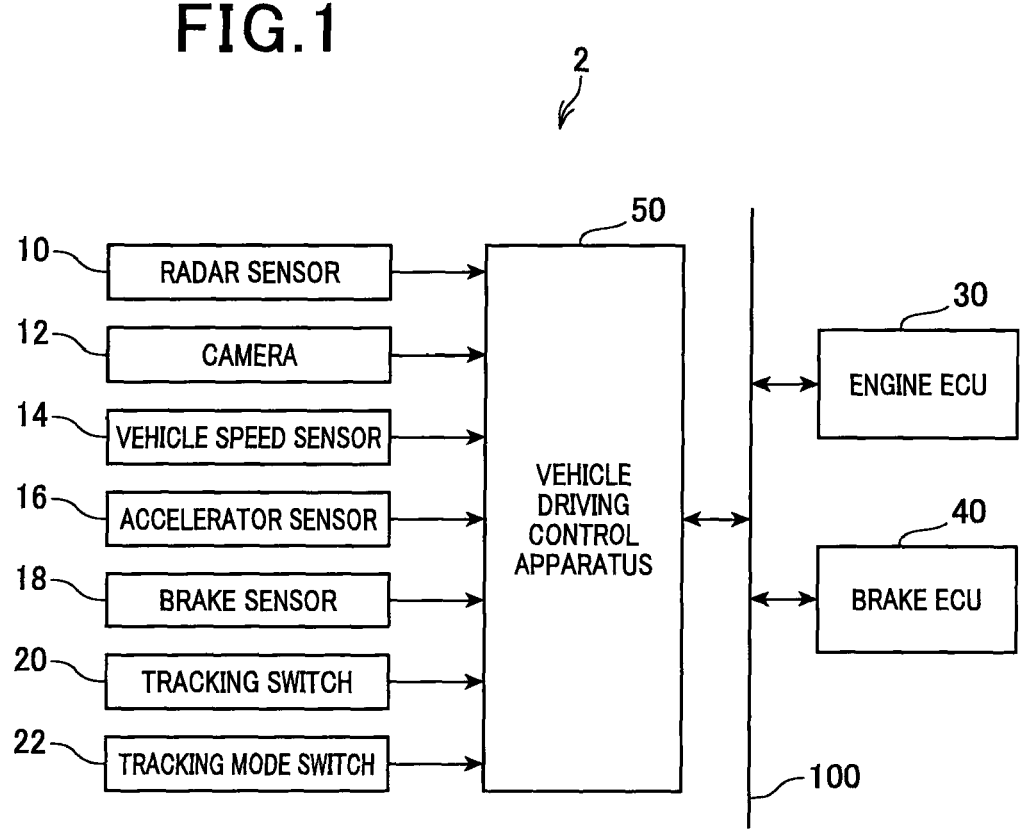
FIG. 1 is a functional block diagram illustrating the overall configuration of a vehicle driving control system which includes a vehicle driving control apparatus according to the exemplary embodiment.

FIG. 1 shows the overall configuration of a vehicle driving control system 2 which includes a vehicle driving control apparatus 50 according to an exemplary embodiment.

The vehicle driving control system 2 is installed in a vehicle (hereinafter, to be referred to as own vehicle) to control driving of the own vehicle. More specifically, the vehicle driving control system 2 is configured to select a preceding vehicle, which runs ahead of the own vehicle, as a target vehicle and control driving of the own vehicle so as to keep the inter-vehicle distance between the own vehicle and the target vehicle constant, thereby making the own vehicle automatically track (or follow) the target vehicle.

The vehicle driving control system 2 includes various sensors for detecting the surrounding situation and driving condition of the own vehicle, various switches, an engine ECU (Electronic Control Unit) 30, a brake ECU 40 and the vehicle driving control apparatus 50.

The various sensors include a radar sensor 10, a camera 12, a vehicle speed sensor 14, an accelerator sensor 16 and a brake sensor 18. The various switches include a tracking switch 20 and a tracking mode switch 22.

The radar sensor 10 is configured to: irradiate a laser beam forward over a predetermined angular range; detect a reflected light that is produced by the reflection of the laser beam by an object; determine the distance from the own vehicle to the object having reflected the laser beam based on the time required for the laser beam to make a round trip between the own vehicle and the object; and determine the azimuth of the object based on the irradiation direction of the laser beam when the reflected light is detected.

In addition, the radar sensor 10 is not limited to a radar sensor using a laser beam. Alternatively, the radar sensor 10 may be implemented by a radar sensor using radio waves in the milli-wave or micro-wave zone or a radar sensor using ultrasonic waves.

The camera 12 is configured to take images of objects present in front of the own vehicle. The images taken by the camera 12 are then analyzed by an image analysis device (not shown in the figures) to determine whether the objects present in front of the own vehicle are obstacles or other vehicles.

The vehicle speed sensor 14 senses the speed of the own vehicle. The accelerator sensor 16 senses the amount of depressing an accelerator pedal of the own vehicle by the driver. The brake sensor 18 senses the amount of depressing a brake pedal of the own vehicle by the driver.

In addition, though it is shown in FIG. 1 that the sensing signals outputted from the vehicle speed sensor 14, the accelerator sensor 16 and the brake sensor 18 are inputted only to the vehicle driving control apparatus 50, those sensing signals are actually inputted to the engine ECU 30 and the brake ECU 40 as well.

The tracking switch 20 is provided for the driver to input a command as to whether or not to perform an Adaptive Cruise Control (ACC). The ACC is a well-known control that makes the own vehicle run at a preset target speed when there is no preceding vehicle and run within a predetermined speed range, when there is a preceding vehicle, so as to keep a predetermined inter-vehicle distance between the own vehicle and the preceding vehicle.

The tracking mode switch 22 is provided for the driver to select, as a tracking mode, both a distance mode that specifies whether to decrease or increase the inter-vehicle distance between the own vehicle and a target vehicle to track in the ACC and a speed range of the own vehicle in the ACC. In addition, the inter-vehicle distance between the own vehicle and the target vehicle may be continuously set within a predetermined range.

Each of the engine ECU 30, the brake ECU 40 and the vehicle driving control apparatus 50 is configured with a microcomputer, an A/D conversion circuit, I/O (Input/Output) interfaces and a communication circuit. The microcomputer includes a CPU (Central Processing Unit), a ROM (Read Only Memory), a RAM (Random Access Memory) and a flash memory. The communication circuit communicates with the other ECUs via an on-vehicle LAN (Local Area Network) 100.

The engine ECU 30 controls operation of an internal combustion engine of the own vehicle. For example, in the case of the engine being a gasoline engine, the engine ECU 30 controls start/stop of the engine, the amount of fuel injected into the engine and ignition timings of the engine. More specifically, the engine ECU 30 controls, based on the sensing signal outputted from the accelerator sensor 16 or a command from the vehicle driving control apparatus 50, a throttle actuator that opens and closes a throttle provided in an intake pipe of the engine, thereby increasing and decreasing the driving force of the engine.

The brake ECU 40 controls, based on the sensing signal outputted from the brake sensor 18 or a command from the vehicle driving control apparatus 50, a brake actuator that applies a braking force to the own vehicle, thereby increasing and decreasing the braking force.

The vehicle driving control apparatus 50 cyclically performs, when the command to perform the ACC is inputted by turning on the tracking switch 20, a process of selecting a preceding vehicle as a target vehicle to track. Further, the vehicle driving control apparatus 50 performs a tracking control process so as to make the own vehicle track the target vehicle. In addition, the vehicle driving control apparatus 50 sets a target inter-vehicle distance in tracking the target vehicle based on the distance mode selected by the tracking mode switch 22 and the speed of the own vehicle.

In the tracking control process, the speed of the own vehicle is normally increased or decreased by controlling the throttle actuator by the engine ECU 30. However, when it is impossible to adjust the speed of the own vehicle to a desired value only by controlling the throttle actuator, the brake ECU 40 controls the brake actuator so as to increase or decrease the speed of the own vehicle in cooperation with the engine ECU 30.

[Tracking Control Process]

When the vehicle driving control apparatus 50 performs the tracking control so that the inter-vehicle distance between the own vehicle and the target vehicle is kept at the target inter-vehicle distance, the relative speed of the target vehicle to the own vehicle is equal to 0. Further, when the target vehicle accelerates or decelerates so that the relative speed becomes positive or negative from 0, the inter-vehicle distance between the own vehicle and the target vehicle is deviated from the target inter-vehicle distance.

In the present embodiment, when the relative speed becomes positive and thus the target vehicle gets further from the own vehicle than the target inter-vehicle distance, the vehicle driving control apparatus 50 commands the engine ECU 30 to accelerate the own vehicle so as to keep the inter-vehicle distance between the own vehicle and the target vehicle at the target inter-vehicle distance. In contrast, when the relative speed becomes negative and thus the target vehicle gets closer to the own vehicle than the target inter-vehicle distance, the vehicle driving control apparatus 50 commands the engine ECU 30 and the brake ECU 40 to decelerate the own vehicle so as to keep the inter-vehicle distance between the own vehicle and the target vehicle at the target inter-vehicle distance.

Moreover, in the present embodiment, the vehicle driving control apparatus 50 sets the target acceleration of the own vehicle in accelerating or decelerating the own vehicle by the following Equation (1):

$$Atgt = \alpha \times Vr \quad (1)$$

where Atgt is the target acceleration, α is the relative speed gain, and Vr is the tracking relative speed when the own vehicle tracks the target vehicle under the tracking control.

In the normal tracking control, the vehicle driving control apparatus 50 sets the tracking relative speed Vr to the actual relative speed of the target vehicle to the own vehicle. In other words, the tracking relative speed Vr is normally set to the actual relative speed of the target vehicle to the own vehicle. Therefore, when the target vehicle accelerates or decelerates so that the actual relative speed becomes positive or negative from 0, the tracking relative speed Vr gradually changes from 0. Consequently, the target acceleration Atgt of the own vehicle also gradually changes, so that the acceleration shock or deceleration shock will be small.

On the other hand, when any of the following events (1)-(4) occurs, the actual relative speed of the target vehicle to the own vehicle may discontinuously change.

(1) During the driving of the own vehicle at a constant speed, a preceding vehicle is newly selected as the target vehicle to track.

(2) An intervening vehicle, which intervenes (or cuts in) between the target vehicle and the own vehicle, replaces the target vehicle to become a new target vehicle.

(3) An override operation made by the driver during the tracking control is completed. The override operation may be an operation of the accelerator pedal for accelerating the own vehicle or an operation of the brake pedal for decelerating the own vehicle.

(4) The tracking switch 20 is operated by the driver of the own vehicle to initiate the tracking control.

Moreover, when the actual relative speed of the target vehicle to the own vehicle discontinuously changes upon occurrence of any of the above events (1)-(4), if the tracking relative speed Vr in Equation (1) was set to the actual relative speed of the target vehicle to the own vehicle, the target acceleration Atgt of the own vehicle might be rapidly changed, thereby causing a large acceleration shock or deceleration shock.

Therefore, in the present embodiment, when any of the above events (1)-(4) occurs, the vehicle driving control apparatus 50 performs, instead of setting the tracking relative speed Vr in Equation (1) to the actual relative speed, a process of correcting the tracking relative speed Vr for reducing the acceleration shock or deceleration shock due to the tracking control.

In addition, in practice, the target acceleration Atgt is set based not only on the tracking relative speed Vr but also on the difference between the target inter-vehicle distance and the actual inter-vehicle distance between the target vehicle and the own vehicle. However, since the target acceleration Atgt depends more on the tracking relative speed Vr than on the difference between the target inter-vehicle distance and the actual inter-vehicle distance, in the present embodiment, for the sake of simplicity, the target acceleration Atgt is explained as being set based only on the tracking relative speed Vr.

[Correction in Accelerating the Own Vehicle]

Figure 2:
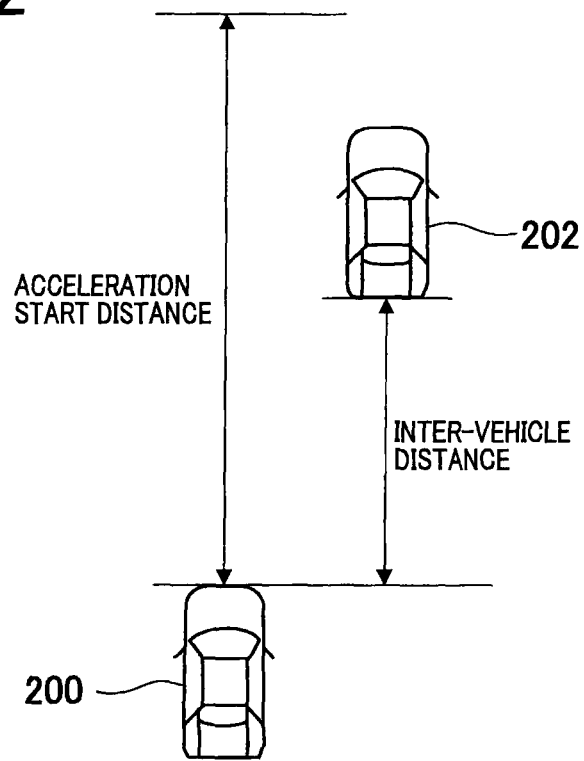
FIG. 2 is a schematic view illustrating the relationship between an acceleration start distance and the inter-vehicle distance between an own vehicle and a target vehicle in accelerating the own vehicle to track the target vehicle.
Figure 3:
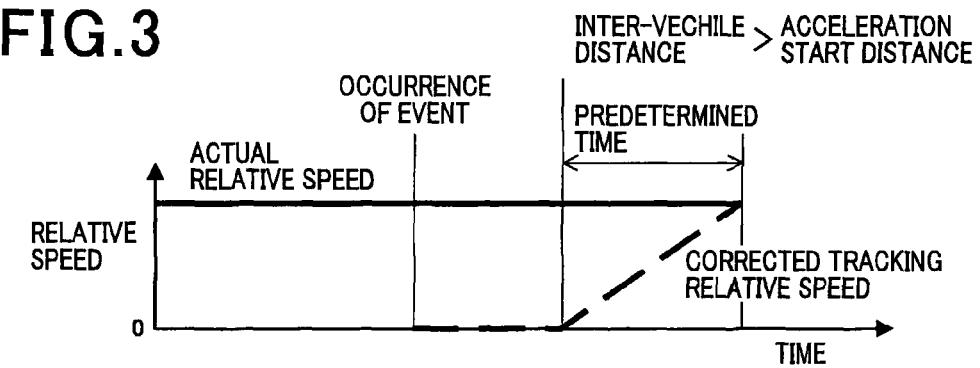
FIG. 3 is a time chart illustrating the corrected tracking relative speed in accelerating the own vehicle to track the target vehicle.

Referring to FIG. 2, when the actual relative speed of the target vehicle 202 to the own vehicle 200 is positive (i.e., the target vehicle 202 gets further from the own vehicle 200) upon occurrence of any of the above-described events (1)-(4), if the inter-vehicle distance between the target vehicle 202 and the own vehicle 200 is shorter than or equal to an acceleration start distance, the vehicle driving control apparatus 50 sets the tracking relative speed Vr in Equation (1) to 0 as shown in FIG. 3. Here, the acceleration start distance denotes a first predetermined distance that is used for determining whether or not to immediately accelerate the own vehicle 200 to track the target vehicle 202.

Further, with the tracking relative speed Vr set to 0, the target acceleration Atgt is also set to 0 based on Equation (1). Consequently, the own vehicle 200 is not accelerated, thus increasing the inter-vehicle distance between the target vehicle 202 and the own vehicle 200. Therefore, in the present embodiment, the acceleration start distance is set based on the speed of the own vehicle 200 and the distance mode selected by the tacking mode switch 22 so as to prevent the target vehicle 202 from leaving too far from the own vehicle 200.

Moreover, when the inter-vehicle distance between the target vehicle 202 and the own vehicle 200 has increased to become longer than the acceleration start distance, the vehicle driving control apparatus 50 gradually increases the tracking relative speed Vr from 0 to the positive actual relative speed of the target vehicle 202 to the own vehicle 200 at a predetermined rate of increase for a predetermined time. Consequently, with the tracking relative speed Vr being gradually increased, the acceleration shock due to the tracking control will be small.

Figure 4:
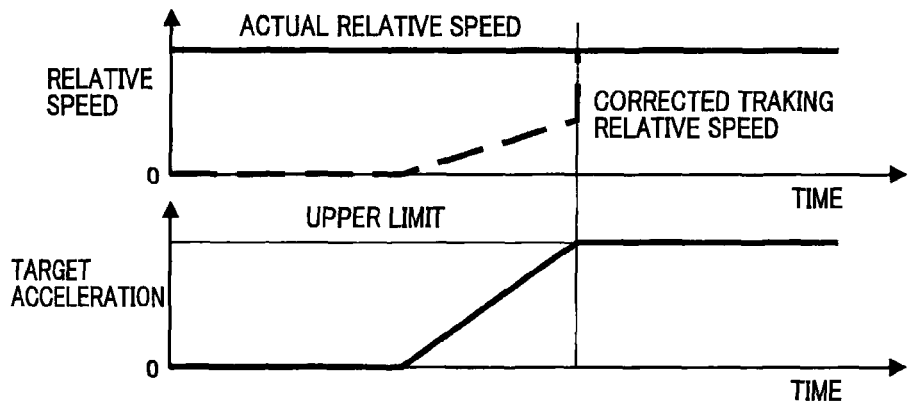
FIG. 4 is a time chart illustrating both the corrected tracking relative speed and the target acceleration in accelerating the own vehicle to track the target vehicle.

Furthermore, considering the driveability of the own vehicle, both upper and lower limits are defined for the target acceleration Atgt calculated by Equation (1). Consequently, as shown in FIG. 4, with the tracking relative speed Vr being gradually increased from 0, the target acceleration Atgt calculated by Equation (1) may reach the upper limit before the tracking relative speed Vr has been increased to the actual relative speed of the target vehicle 202 to the own vehicle 200. In this case, the vehicle driving control apparatus 50 sets the tracking relative speed Vr to the actual relative speed upon the target acceleration Atgt reaching the upper limit. In addition, after the setting of the tracking relative speed Vr to the actual relative speed, the target acceleration Atgt is still kept at the upper limit.

[Correction in Decelerating the Own Vehicle]

Figure 5:
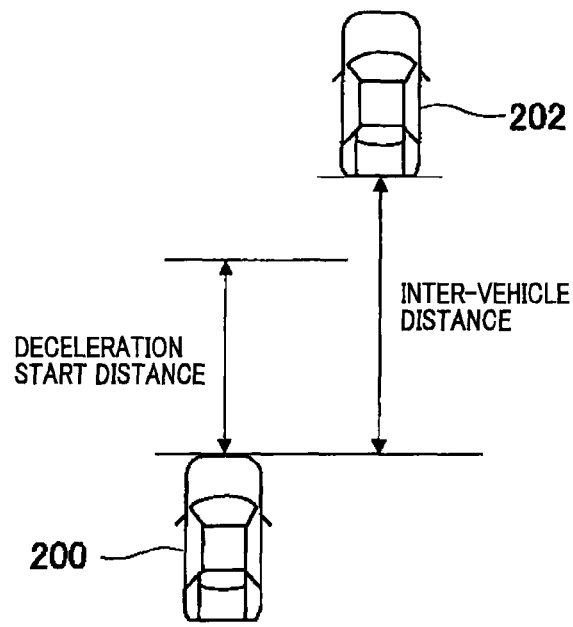
FIG. 5 is a schematic view illustrating the relationship between a deceleration start distance and the inter-vehicle distance between the own vehicle and the target vehicle in decelerating the own vehicle to track the target vehicle.
Figure 6:
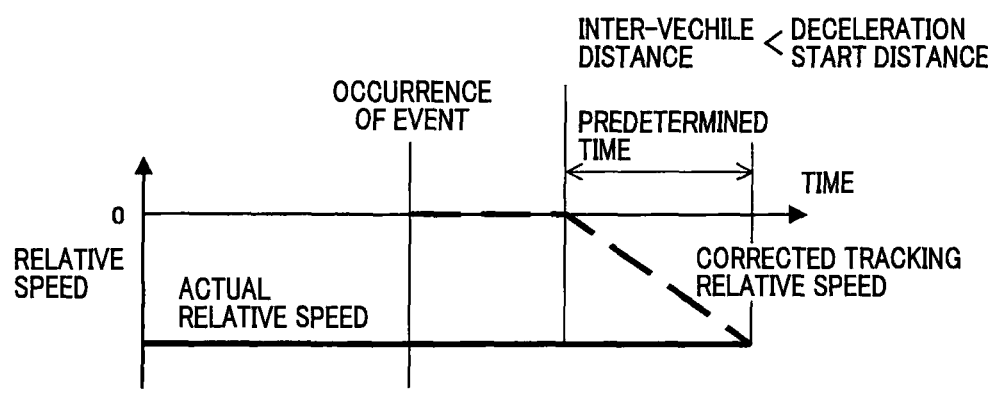
FIG. 6 is a time chart illustrating the corrected tracking relative speed in decelerating the own vehicle to track the target vehicle.

Referring to FIG. 5, when the actual relative speed of the target vehicle 202 to the own vehicle 200 is negative (i.e., the target vehicle 202 gets closer to the own vehicle 200) upon occurrence of any of the above-described events (16)-(4), if the inter-vehicle distance between the target vehicle 202 and the own vehicle 200 is longer than or equal to a deceleration start distance, the vehicle driving control apparatus 50 sets the tracking relative speed Vr in Equation (1) to 0 as shown in FIG. 6. Here, the deceleration start distance denotes a second predetermined distance that is used for determining whether or not to immediately decelerate the own vehicle 200 to track the target vehicle 202.

Further, with the tracking relative speed Vr set to 0, the target acceleration Atgt is also set to 0 based on Equation (1). Consequently, the own vehicle 200 is not decelerated, thus decreasing the inter-vehicle distance between the target vehicle 202 and the own vehicle 200. Therefore, in the present embodiment, the deceleration start distance is set based on the speed of the own vehicle 200 and the distance mode selected by the tacking mode switch 22 so as to prevent the target vehicle 202 from approaching too close to the own vehicle 200.

Moreover, when the inter-vehicle distance between the target vehicle 202 and the own vehicle 200 has decreased to become shorter than the deceleration start distance, the vehicle driving control apparatus 50 gradually decreases the tracking relative speed Vr from 0 to the negative actual relative speed of the target vehicle 202 to the own vehicle 200 at a predetermined rate of decrease for a predetermined time. Consequently, with the tracking relative speed Vr being gradually decreased, the deceleration shock due to the tracking control will be small.

Figure 7:
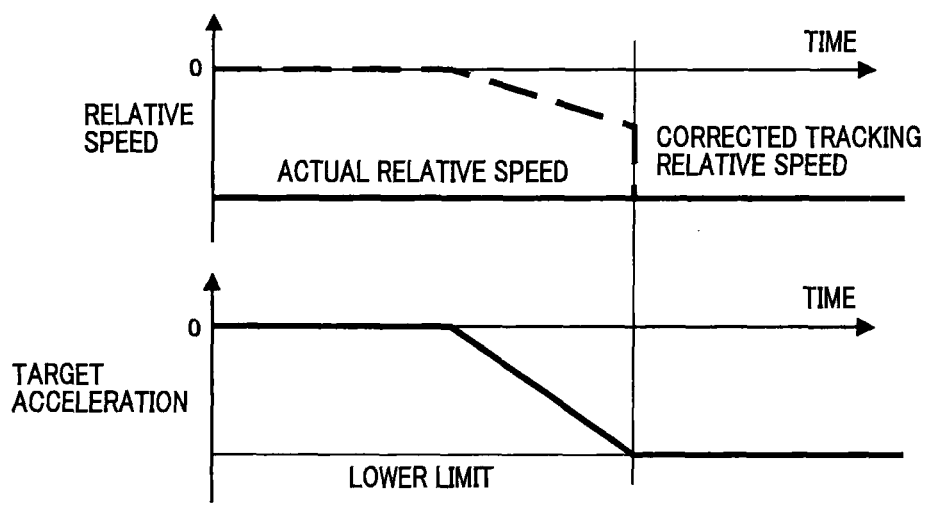
FIG. 7 is a time chart illustrating both the corrected tracking relative speed and the target deceleration in decelerating the own vehicle to track the target vehicle.

Furthermore, as shown in FIG. 7, with the tracking relative speed Vr being gradually decreased from 0, the target acceleration Atgt calculated by Equation (1) may reach the lower limit before the tracking relative speed Vr has been decreased to the actual relative speed of the target vehicle 202 to the own vehicle 200. In this case, the vehicle driving control apparatus 50 sets the tracking relative speed Vr to the actual relative speed upon the target acceleration Atgt reaching the lower limit. In addition, after the setting of the tracking relative speed Vr to the actual relative speed, the target acceleration Atgt is still kept at the lower limit.

Next, the tracking control process according to the present embodiment will be described in detail with reference to FIG. 8. This process is performed by the CPU of the vehicle driving control apparatus 50 by executing a program stored in the ROM or flash memory of the apparatus 50. In addition, this process is constantly repeated when the tracking switch 20 is in an ON state.

First, at step S400, the vehicle driving control apparatus 50 determines whether any of the above-described events (1)-(4) has occurred. In other words, when any of the above-described events (1)-(4) has occurred, the vehicle driving control apparatus 50 detects the occurrence of the event at this step.

If the determination at step S400 results in a "NO" answer, then the process proceeds to step S420.

At step S420, if there is already a preceding vehicle selected as the target vehicle, the vehicle driving control apparatus 50 sets the tracking relative speed Vr to the actual relative speed of the target vehicle to the own vehicle. Then, the vehicle driving control apparatus 50 calculates the target acceleration Atgt by Equation (1). Consequently, the own vehicle is made to track the target vehicle.

In contrast, at step S420, if there is no preceding vehicle selected as the target vehicle, the vehicle driving control apparatus 50 sets the tracking relative speed Vr based on the difference between the preset target vehicle speed and the actual speed of the own vehicle sensed by the vehicle speed sensor 14. Then, the vehicle driving control apparatus 50 calculates the target acceleration Atgt by Equation (1). Consequently, the actual speed of the own vehicle is brought into agreement with the target vehicle speed.

On the other hand, if the determination at step S400 results in a "YES" answer, then the process proceeds to step S401.

At step S401, the vehicle driving control apparatus 50 acquires both the actual relative speed of the target vehicle to the own vehicle and the inter-vehicle distance between the target vehicle and the own vehicle. More specifically, at this step, the vehicle driving control apparatus 50 acquires the inter-vehicle distance between the target vehicle and the own vehicle from the radar sensor 10 and calculates the actual relative speed of the target vehicle to the own vehicle based on the change with time of the inter-vehicle distance.

At step S402, the vehicle driving control apparatus 50 further determines whether a first correction condition is satisfied. Here, the first correction condition is such that the actual relative speed of the target vehicle to the own vehicle is positive and the inter-vehicle distance between the target vehicle and the own vehicle is shorter than or equal to the acceleration start distance (i.e., the first predetermined distance).

If the determination at step S402 results in a "YES" answer, then the process proceeds to step S404.

At step S404, the vehicle driving control apparatus 50 sets a correction flag to 1. Then, at step S406, the vehicle driving control apparatus 50 performs a first relative speed correction in which the tracking relative speed Vr is set to 0. Thereafter, the process proceeds to step S420.

In contrast, if the determination at step S402 results in a "NO" answer, then the process proceeds to step S408.

At step S408, the vehicle driving control apparatus 50 further determines whether a second correction condition is satisfied. Here, the second correction condition is such that the actual relative speed of the target vehicle to the own vehicle is negative and the inter-vehicle distance between the target vehicle and the own vehicle is longer than or equal to the deceleration start distance (i.e., the second predetermined distance).

If the determination at step S408 results in a "YES" answer, then the process proceeds to step S410.

At step S410, the vehicle driving control apparatus 50 sets the correction flag to 1. Then, at step S412, the vehicle driving control apparatus 50 performs a second relative speed correction in which the tracking relative speed Vr is set to 0. Thereafter, the process proceeds to step S420.

In contrast, if the determination at step S408 results in a "NO" answer, then the process proceeds to step S414.

At step S414, the vehicle driving control apparatus 50 sets the correction flag to 0. Then, at step S416, the vehicle driving control apparatus 50 further determines whether the correction flag has been changed from 1 to 0 at step S414.

If the determination at step S416 results in a "NO" answer, in other words, if neither of the first and second correction conditions at steps S402 and S408 has been satisfied and thus the correction flag has not been set to 1 at either of steps S404 and S410 before step S414, then the process directly proceeds to step S420 without performing step S418.

In contrast, if the determination at step S416 results in a "YES" answer, in other words, if either of the first and second correction conditions at steps S402 and S408 has been satisfied and thus the correction flag has been set to 1 at either of steps S404 and S410 before step S414, then the process proceeds to step S418.

At step S418, the vehicle driving control apparatus 50 performs a third relative speed correction in which the absolute value of the tracking relative speed Vr is gradually increased from 0. Thereafter, the process proceeds to step S420.

At step S420, the vehicle driving control apparatus 50 calculates the target acceleration Atgt by Equation (1).

At step S422, the vehicle driving control apparatus 50 determines whether the target acceleration Atgt has been changed (i.e., increased or decreased) to reach either the upper limit or the lower limit.

If the determination at step S422 results in a "YES" answer, then the process directly returns to step S400 without performing step S424.

In contrast, if the determination at step S422 results in a "NO" answer, then the process proceeds to step S424.

At step S424, the vehicle driving control apparatus 50 further determines whether the correction flag is equal to 0.

If the determination at step S424 results in a "YES" answer, then the process returns to step S400. In contrast, if the determination at step S424 results in a "NO" answer, then the process returns to step S401.

In addition, at step S400, all the results caused by the previous determination at step S400 are cleared.

With the above tracking control process, for example, when the event (1) has occurred (i.e., a preceding vehicle is newly selected as the target vehicle to track), the determination at step S400 will result in a "YES" answer.

Further, when the actual relative speed of the target vehicle to the own vehicle is positive and the inter-vehicle distance between the target vehicle and the own vehicle is longer than the acceleration start distance, all the determinations at steps S402, S408 and S416 will result in a "NO" answer. Consequently, the process will directly proceed to step S420 without performing any of the first to the third relative speed corrections at steps S406, S412 and S418.

Moreover, in this case, the vehicle driving control apparatus 50 will set the tracking relative speed Vr to the actual relative speed of the target vehicle to the own vehicle and calculate the target acceleration Atgt by Equation (1). Further, the vehicle driving control apparatus 50 will compare the target acceleration Atgt with a target acceleration calculated based on the target vehicle speed and perform the tracking control with the smaller one of the two target accelerations.

Otherwise, when the actual relative speed of the target vehicle to the own vehicle is negative and the inter-vehicle distance between the target vehicle and the own vehicle is shorter than the deceleration start distance, all the determinations at steps S402, S408 and S416 will result in a "NO" answer. Consequently, the process will directly proceed to step S420 without performing any of the first to the third relative speed corrections at steps S406, S412 and S418.

Moreover, in this case, the vehicle driving control apparatus 50 will set the tracking relative speed Vr to the negative actual relative speed of the target vehicle to the own vehicle and calculate the target acceleration Atgt by Equation (1). Consequently, the calculated target acceleration Atgt will also be negative. That is, when the actual relative speed of the target vehicle to the own vehicle is negative and the inter-vehicle distance between the target vehicle and the own vehicle is shorter than the deceleration start distance, the vehicle driving control apparatus 50 will immediately decelerate the own vehicle, thereby preventing the own vehicle from approaching (or getting closer to) the target vehicle.

The above-described vehicle driving control apparatus 50 according to the present embodiment has the following advantages.

In the present embodiment, the vehicle driving control apparatus 50 is configured to: (1) acquire the actual relative speed of the target vehicle to the own vehicle (see step S401 of FIG. 8); (2) detect occurrence of an event (e.g., any of the above-described events (1)-(4)) which causes the actual relative speed of the target vehicle to the own vehicle to discontinuously change (see step S400 of FIG. 8); (3) set the target acceleration Atgt of the own vehicle based on the product of the relative speed gain a and the tracking relative speed Vr when the own vehicle tracks the target vehicle (see Equation (1) and step S420 of FIG. 8); and (4) correct, upon detection of occurrence of the event, the tracking relative speed Vr so as to gradually increase the absolute value of the tracking relative speed Vr from 0 to approach the absolute value of the actual relative speed of the target vehicle to the own vehicle (see steps S406, S412 and S418 of FIG. 8).

Consequently, by correcting the tracking relative speed Vr in the above manner, it is possible to reduce the acceleration shock or deceleration shock caused by the tracking control when the actual relative speed of the target vehicle to the own vehicle discontinuously changes upon occurrence of the event. Moreover, by setting the target acceleration Atgt of the own vehicle based on the thus-corrected tracking relative speed Vr, it is possible to smoothly accelerate or decelerate the own vehicle to track (or follow) the target vehicle.

Figure 8:
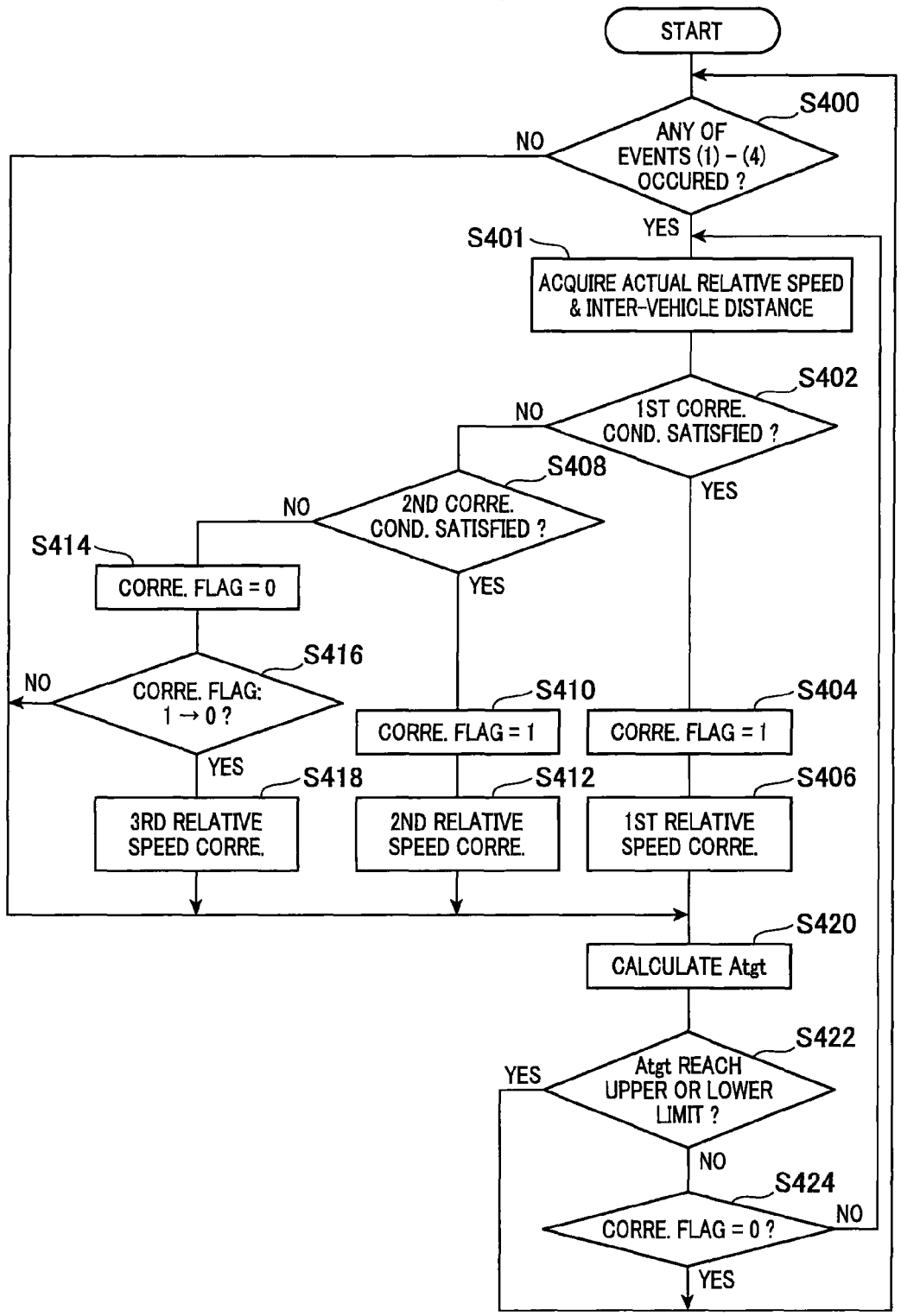
FIG. 8 is a flow chart illustrating a tracking control process performed by the vehicle driving control apparatus.

Further, in the present embodiment, the vehicle driving control apparatus 50 is configured to acquire the inter-vehicle distance between the target vehicle and the own vehicle as well (see step S401 of FIG. 8). Moreover, upon detection of occurrence of the event, the vehicle driving control apparatus 50 sets the tracking relative speed Vr to 0 (see steps S406 and S412 of FIG. 8) as long as the first or the second correction condition is satisfied (see steps S402 and S408 of FIG. 8) and then gradually increases the absolute value of the tracking relative speed Vr from 0 (see step S418 of FIG. 8). The first correction condition is such that the actual relative speed of the target vehicle to the own vehicle is positive and the inter-vehicle distance between the target vehicle and the own vehicle is shorter than or equal to the acceleration start distance (or the first predetermined distance). The second correction condition is such that the actual relative speed of the target vehicle to the own vehicle is negative and the inter-vehicle distance between the target vehicle and the own vehicle is longer than or equal to the deceleration start distance (i.e., the second predetermined distance).

With the above configuration, it is possible to more reliably reduce the acceleration shock or deceleration shock caused by the tracking control when the actual relative speed of the target vehicle to the own vehicle discontinuously changes upon occurrence of the event. Moreover, it is also possible to more smoothly accelerate or decelerate the own vehicle to track the target vehicle.

Furthermore, in the present embodiment, there are both the upper and lower limits defined for the target acceleration Atgt calculated by Equation (1).

Consequently, setting the target acceleration Atgt within the range between the upper and lower limits, it is possible to secure the driveability of the own vehicle.

While the above particular embodiment has been shown and described, it will be understood by those skilled in the art that various modifications, changes, and improvements may be made without departing from the spirit of the present invention.

For example, in the previous embodiment, the vehicle driving control apparatus 50 corrects the tracking relative speed Vr so as to gradually increase the absolute value of the tracking relative speed Vr from 0. However, to the extent that it is possible to reliably reduce the acceleration shock or deceleration shock, the vehicle driving control apparatus 50 may be modified to correct the tracking relative speed Vr so as to gradually increase the absolute value of the tracking relative speed Vr from a value that is greater than 0 and less than the absolute value of the actual relative speed of the target vehicle to the own vehicle.

Moreover, in the previous embodiment, upon detection of occurrence of any of the events (1)-(4), the vehicle driving control apparatus 50 sets the tracking relative speed Vr to 0 as long as the first or the second correction condition is satisfied and then gradually increases the absolute value of the tracking relative speed Vr from 0. However, the vehicle driving control apparatus 50 may be modified to gradually increase the absolute value of the tracking relative speed Vr from 0 immediately after detection of occurrence of any of the events (1)-(4).

What is claimed is:

1. A vehicle driving control apparatus for controlling an own vehicle to track a target vehicle, the target vehicle being a preceding vehicle which runs ahead of the own vehicle and is selected by the vehicle driving control apparatus to be tracked by the own vehicle, the vehicle driving control apparatus comprising:
    means for acquiring an actual relative speed of the target vehicle to the own vehicle;
    means for detecting occurrence of an event which causes the actual relative speed of the target vehicle to the own vehicle to discontinuously change;
    means for setting a target acceleration of the own vehicle based on the product of a relative speed gain and a tracking relative speed when the own vehicle tracks the target vehicle, the tracking relative speed being normally set to the actual relative speed of the target vehicle to the own vehicle; and
    means for correcting, upon detection of occurrence of the event by the detecting means, the tracking relative speed so as to gradually increase the absolute value of the tracking relative speed from a value that is less than the absolute value of the actual relative speed of the target vehicle to the own vehicle.

2. The vehicle driving control apparatus as set forth in claim 1, wherein the correcting means corrects the tracking relative speed so as to gradually increase the absolute value of the tracking relative speed from 0.

3. The vehicle driving control apparatus as set forth in claim 1, wherein the correcting means corrects the tracking relative speed so as to gradually increase the absolute value of the tracking relative speed to approach the absolute value of the actual relative speed of the target vehicle to the own vehicle.

4. The vehicle driving control apparatus as set forth in claim 1, wherein the event is one of the following: (1) a preceding vehicle is newly selected as the target vehicle; (2) an intervening vehicle, which intervenes between the target vehicle and the own vehicle, replaces the target vehicle to become a new target vehicle; (3) an operation of accelerating or decelerating the own vehicle, which is made by a driver of the own vehicle during the tracking control, is completed; and (4) the tracking control is initiated by the driver of the own vehicle.

5. The vehicle driving control apparatus as set forth in claim 1, further comprising means for acquiring an inter-vehicle distance between the target vehicle and the own vehicle,
    wherein upon detection of occurrence of the event by the detecting means, the correcting means sets the tracking relative speed to 0 as long as a first or a second correction condition is satisfied and then gradually increases the absolute value of the tracking relative speed from 0,
    the first correction condition being such that the actual relative speed of the target vehicle to the own vehicle is positive and the inter-vehicle distance between the target vehicle and the own vehicle is shorter than or equal to a first predetermined distance,
    the second correction condition being such that the actual relative speed of the target vehicle to the own vehicle is negative and the inter-vehicle distance between the target vehicle and the own vehicle is longer than or equal to a second predetermined distance.

6. The vehicle driving control apparatus as set forth in claim 1, wherein there are both upper and lower limits defined for the target acceleration of the own vehicle set by the setting means.

7. A vehicle driving control apparatus for controlling an own vehicle to track a target vehicle, the target vehicle being a preceding vehicle which runs ahead of the own vehicle and is selected by the vehicle driving control apparatus to be tracked by the own vehicle, the vehicle driving control apparatus comprising:
    means for acquiring an actual relative speed of the target vehicle to the own vehicle;
    means for detecting occurrence of an event which causes the actual relative speed of the target vehicle to the own vehicle to discontinuously change;
    means for setting a target acceleration of the own vehicle based on the product of a relative speed gain and a tracking relative speed when the own vehicle tracks the target vehicle, the tracking relative speed being normally set to the actual relative speed of the target vehicle to the own vehicle;
    means for correcting, upon detection of occurrence of the event by the detecting means, the tracking relative speed so as to gradually increase the absolute value of the tracking relative speed from a value that is less than the absolute value of the actual relative speed of the target vehicle to the own vehicle; and
    means for acquiring an inter-vehicle distance between the target vehicle and the own vehicle,
    wherein upon detection of occurrence of the event by the detecting means, the correcting means sets the tracking relative speed to 0 as long as a first or a second correction condition is satisfied and then gradually increases the absolute value of the tracking relative speed from 0, the first correction condition being such that the actual relative speed of the target vehicle to the own vehicle is positive and the inter-vehicle distance between the target vehicle and the own vehicle is shorter than or equal to a first predetermined distance, the second correction condition being such that the actual relative speed of the target vehicle to the own vehicle is negative and the inter-vehicle distance between the target vehicle and the own vehicle is longer than or equal to a second predetermined distance.

* * * * *